(12) United States Patent
Ahluwalia

(10) Patent No.: US 8,358,643 B2
(45) Date of Patent: Jan. 22, 2013

(54) MODIFIED CONNECTION SETUP FOR E-UTRA RADIO RESOURCE CONTROL

(75) Inventor: Jagdeep Singh Ahluwalia, Sutton (GB)

(73) Assignee: NEC Corporation, Tokyo (JP)

(*) Notice: Subject to any disclaimer, the term of this patent is extended or adjusted under 35 U.S.C. 154(b) by 1060 days.

(21) Appl. No.: 12/223,706

(22) PCT Filed: Feb. 7, 2007

(86) PCT No.: PCT/JP2007/052542
§ 371 (c)(1),
(2), (4) Date: Aug. 7, 2008

(87) PCT Pub. No.: WO2007/091715
PCT Pub. Date: Aug. 16, 2007

(65) Prior Publication Data
US 2009/0201864 A1 Aug. 13, 2009

(30) Foreign Application Priority Data

Feb. 8, 2006 (GB) .................................. 0602556.3
Jun. 20, 2006 (GB) .................................. 0612237.8

(51) Int. Cl.
*H04J 3/00* (2006.01)

(52) U.S. Cl. ........ 370/345; 370/442; 370/467; 370/469; 370/474; 370/476

(58) Field of Classification Search .................. 370/345, 370/347, 442, 466, 467, 469, 473, 474, 476, 370/537
See application file for complete search history.

(56) References Cited

U.S. PATENT DOCUMENTS 5,301,189 A * 4/1994 Schmidt et al. ............... 370/356
(Continued)

FOREIGN PATENT DOCUMENTS

EP 1 313 344 A2 5/2003
JP 2001-177861 A 6/2001
(Continued)

OTHER PUBLICATIONS

Japanese Office Action dated Dec. 21, 2011 with a partial English translation.

(Continued)

*Primary Examiner* — Bo Hui A Zhu
(74) *Attorney, Agent, or Firm* — McGinn IP Law Group, PLLC

(57) ABSTRACT

A communication method for reducing Radio Resource Control (RRC) connection setup time in an Evolved Universal Terrestrial Radio Access Network (E-UTRAN) includes the step of using an inclusive Signalling Radio Bearer (iSRB) in place of a plurality of individual Signalling Radio Bearers (indSRBs) for transferring signals from Radio Resource Control (RRC) to Medium Access Control (MAC). A Protocol Discriminator (PD) is added to the tail (right side) of each indSRB at the RRC for allowing the MAC to identify each indSRB as received in the iSRB. The PD is needed because the MAC would otherwise be unable to place each indSRB into the appropriate prioritizing queue for trans-mission to the physical layer. The PD is stripped off at the MAC. A preferred embodiment uses the iSRB in place of four individual indSRBs (SRB1, SRB2, SRB3 and SRB4), but in an alternative form the Unacknowledged Mode SRB (SRBI) would not be present in the system and therefore not included in the iSRB.

3 Claims, 6 Drawing Sheets

U.S. PATENT DOCUMENTS 6,751,227 B1 * 6/2004 Ahmavaara et al. .......... 370/410
2004/0062276 A1 * 4/2004 Uhlik et al. .................. 370/474

FOREIGN PATENT DOCUMENTS

| WO | WO 99/14963 | 3/1999 |
|---|---|---|
| WO | WO 99/16264 | 4/1999 |

OTHER PUBLICATIONS

3rd Generation Partnership Project; Technical Specification Group Radio Access Network; Radio Interface Protocol Architecture, 3GPP TS 25.301 V6.4.0, Sep. 2005, p. 9-11 (Search dated Dec. 14, 2011), URL, http://www.3gpp.org/ftp/Specs/archive/25_series/25.301/25301-640.zip.

* cited by examiner

PRIOR ART FIG. 2

MODIFIED CONNECTION SETUP FOR E-UTRA RADIO RESOURCE CONTROL

TECHNICAL FIELD

The subject invention relates to a Radio Resource Control (RRC) setup procedure for E-UTRA, and more particularly, to a modified procedure for reducing RRC connection setup time.

The Third Generation Partnership Project (3GPP) utilizes the Universal Mobile Telecommunications System (UMTS), which supports a wide range of telecommunication applications. The UMTS architecture includes User Equipment (UE), Core Network (CN), and UMTS Terrestrial Radio Access (UTRA) over a UTRA Network (UTRAN). Recent work on improving on UTRA involves Evolved-UTRA (E-UTRA), which forms part of what is termed the LTE (Long-Term Evolution) project. E-UTRA uses purely packet-switched network infrastructure, without circuit-switching or dedicated connections; the air interface is not CDMA but OFDMA on the downlink and SC-FDMA (Single-Carrier FDMA) on the up-link. The subject invention is directed to E-UTRA operation. E-UTRA terminology is still evolving, and the terms E-RRC, E-MAC and E-NodeB for the respective terms RRC, MAC and Node B in E-UTRA are in use but not as yet accepted generally in the field. Therefore, this document maintains use of the terms RRC, MAC and NodeB, but it should be kept in mind that they are being used in the context of UMTS E-UTRA technology.

E-UTRA is expected to replace UTRA for UMTS within the next decade. E-UTRA offers the benefits over UTRA of reduced latency, higher user data rates, improved system capacity and coverage, and reduced cost for the operator. Considering a desire for ever higher data rates and considering future additional 3GPP spectrum allocations, the long-term 3GPP evolution should include broadening transmission bandwidth beyond 5 MHz. At the same time, there are advantages in also implementing E-UTRA within the present 5 MHz bandwidths.

In E-UTRA, as in UTRA, there exists the two interfaces, UE-UTRAN (Uu) and CN-UTRAN (Iu). The protocols over each of the Uu and Iu interfaces are divided between the User Plane (U-Plane) protocols which govern formatting of the information for transport, and the Control Plane (C-Plane) protocols which govern control signalling for the transport and maintain connection between the UE and the CN. The Uu and Iu protocols provide transfer of Non-Access Stratum (NAS) messages, where NAS generally refers to protocol groups used once call-access is achieved and may be compared to Access Stratum (AS) protocol groups for establishing such call-access. As shown in FIG. 1, the Access Stratum involves the UE (User Equipment), RAN (Radio Access Network) and the Core Network, whereas the Non-Access Stratum involves direct communication between the UE and CN. The NAS protocol groups include (as is shown in FIG. 1) Call Control (CC), Mobility Management (MM) and Session Management (SM). Although not shown, there also exists a Short Message Services (SMS) protocol.

When a UE is powered on or when the UE moves from one cell to another, there is a need to establish a communication path, or new communication path, between that UE and the CN. While turned on, the UE is constantly checking the strength of pilot signals and forwarding that information to a RNC (Radio Network Controller) in the RAN. The RNC determines at all times the path of communications between the UE and the CN, and this may involve a handover of the UE by the RNC to a different RNC. Once the communications path is selected, the UE needs to establish a RRC connection setup to forward data to the CN. The Radio Access Bearer (RAB) is a service provided by the AS to the NAS in order to transfer such user data from the UE to the CN. A bearer is described by a set of parameters (attributes) that define the particular traffic aspect or Quality-of-Service profile of a particular application or service, as such, a bearer can be considered to be in effect a channel. As shown in FIG. 1, the NAS and the AS communicate through radio protocols extending between the UE and the RAN. As shown in FIG. 2, control data is passed from the NAS 10 to the Radio Resource Control (RRC) level 12, through a high-priority channel 14 or a low-priority channel 16, and from there the control data is conventionally passed through at least four Signalling Radio Bearers (SRBs), 17 to 20, to the Medium Access Control (MAC) 22. The MAC 22 then forwards the control data to the physical layer (not shown) of the UE through transport channels, and the physical layer acts on radio transmitting the control data to a nodeB, from where it is forwarded to the RNC. Although the uplink has been described, a similar process occurs at NodeB for sending control data in the downlink direction, and FIG. 2 is equally applicable to both.

The conventional RRC level 12 normally sets up four SRBs at the time of RRC Connection Setup procedure in order to forward the control data to the MAC. Each SRB is associated with a respective Radio Link Control (RLC). SRB1 is used to carry RRC signalling performed in support of AS specific needs, with a RLC operating in Unacknowledged Mode (UM). SRB2 is also used to carry RRC signalling performed in support of AS specific needs, but with a RLC operating in Acknowledged Mode (AM). SRB3 is used to carry high-priority RRC signalling performed in support of NAS specific needs (RLC in AM), and SRB4 is used to carry low-priority RRC signalling performed in support of NAS specific needs (RLC in AM). There also exists a SRB0 signalling bearer, but that is not of interest to the invention.

DISCLOSURE OF INVENTION

In one aspect, the subject invention provides a communication method for communicating data between a Radio Resource Control (RRC) and a Medium Access Control (MAC) using at least one Signalling Radio Bearer. The communicating includes using at least one inclusive Signalling Radio Bearer (iSRB) serving the function of a plurality of individual Signalling Radio Bearers (indSRBs).

Preferably, at least two mutually distinct priorities are defined for the indSRBs, and the iSRB serves the function of indSRBs that have mutually-distinct priorities.

Preferably, the communicating step further includes communicating, as part of the iSRB, a Protocol Discriminator (PD) for identifying, at any one time, which one of the indSRBs the iSRB is being used in place of. More preferably, the PD includes binary digits that are additional to the binary digits normally comprised in a indSRB. Yet more preferably, the PD includes additional binary digits on one of the ends of the iSRB. Yet even more preferably, the additional binary digits include two binary digits.

Preferably, each indSRB relates to Acknowledged-Mode (AM) signals only. More preferably, the AM signals are RRC message signals (SRB2), High-Priority Non-Access Stratum (NAS) message signals (SRB3), and Low-Priority NAS message signals (SRB4). Yet more preferably, the respective PDs to identify which one of the indSRBs is being represented by the iSRB at any onetime are: PD=00, indSRB=SRB1 and SRB2; PD=01, indSRB=SRB3; PD=10, indSRB=SRB4.

Preferably, the method further includes the steps of: identifying, upon arrival at the MAC, the respective indSRBs, prioritizing, at the MAC, the indSRBs inter se according to a predetermined priority schedule; and, transmitting, from the MAC, the indSRBs according to the priority given them in the prioritizing step.

Preferably, the PD is not transmitted from the MAC with the indSRBs

In a second aspect, the subject invention provides a Radio Resource Control (RRC) connection-setup procedure for reducing RRC connection setup time, the procedure including an inclusive Signalling Radio Bearer (iSRB) communicated in place of plurality of individual Signalling Radio Bearers (indSRBs) for transferring signals from Radio Resource Control (RRC) to Medium Access Control (MAC).

Preferably, at least two mutually-distinct priorities are defined for the indSRBs, and the iSRB serves the function of indSRBs that have mutually-distinct priorities.

Preferably, part of the communicated iSRB is a Protocol Discriminator (PD) for identifying, at any one time, which one of the indSRBs the iSRB is acting in place of. More preferably, the PD includes binary digits that are additional to the binary digits normally comprised in a indSRB Yet more preferably, the PD includes additional binary digits on one of the ends of the iSRB. Yet even more preferably, the additional binary digits include two binary digits.

Preferably, each indSRB relates to Acknowledged-Mode (AM) signals only. More preferably, the AM signals are RRC message signals (SRB2), High-Priority Non-Access Stratum (NAS) message signals (SRB3), and Low-Priority NAS message signals (SRB4). Still more preferably, the respective PDs to identify which one of the indSRBs is being represented by the iSRB at any one time are: PD=00, indSRB=SRB1 and SRB2; PD=01, indSRB=SRB3, PD=10, indSRB=SRB4.

In a third aspect, the subject invention is a Signalling Radio Bearer (SRB) utilized in a communication method for communicating data between a Radio Resource Control (RRC) and a Medium Access Control (MAC), the Signalling Radio Bearer being characterized in that the communicating includes using at least one inclusive Signalling Radio Bearer (iSRB) serving the function of a plurality of individual Signalling Radio Bearers (indSRBs).

Preferably, at least two mutually-distinct priorities are defined for the indRSBs, and the iSRB serves the function of indSRBs that have mutually-distinct priorities.

Preferably, part of the iSRB is a Protocol Identifier (PD) for identifying, at any one time, which one of the indSRBs the iSRB is acting in place of. More preferably, the PD includes binary digits that are additional to the binary digits normally included in an indSRB. Yet more preferably, the PD includes additional binary digits on one of the ends of the iSRB Yet even more preferably, the additional binary digits include two binary digits.

Preferably, each indSRB relates to Acknowledged-Mode (AM) signals only. More preferably, the AM signals are RRC message signals (SRB2), High-Priority Non-Access Stratum (NAS) message signals (SRB3), and Low-Priority NAS message signals (SRB4). Yet more preferably, the respective PDs to identify which one of the indSRBs is being represented by the iSRB at any one time are: PD=00, indSRB=SRB1 and SRB2, PD=01, indSRB=SRB3; PD=10, indSRB=SRB4.

The subject invention concerns reducing the time taken to set up the RRC Connection Setup procedure. The four SRBs 17 to 20 shown in FIG. 2 are set up serially, and this has been found to typically require about 830 milliseconds, with the length of that period being independent of the bit rates of the SRBs (3.7 kbps to 14.8 kbps). Note that actual transmission time for the control data on the four SRBs does not take the 830 milliseconds; rather that time is taken by the RRC in setting up the four SRBs and preparing them for the transmissions. If only a reduced number of SRBs needed to be set up, and that reduced number used for transmitting more than one of the conventional SRBs, transmission setup delay could be reduced. The subject invention is directed to that end.

With the subject invention there may not be any significant gain in the overall network in terms of timing since in a network there is no constraint on processing power. However, in the UE there can be significant gain in terms of processing time and simplicity.

If four SRBs are to be established, a UE will perform, after receiving RRC Connection Setup, the following checks regarding the setup of the RLC entities:
(i) Check of the uplink configuration for all 4 SRBs;
(ii) Check of the downlink configuration for all 4 SRBs;
(iii) Proceed to establish the 4 SRBs.

If the number of SRBs is reduced to one, there will be a reduction in time and complexity required for the (i) and (ii) checks since the number of RLC parameters to be checked in the UE is reduced. Furthermore, there will be a significant reduction in the message size of RRC Connection Setup even when a complete RLC configuration is provided. There is a considerable saving in RLC Resources both in the E-Node B and in the UE. Setting up just one AM RLC entity for SRB in a UE will free two AM RLC entities that can be used for the user plane. Hence, more RABs can be supported for a given UE reference class in LTE requiring AM entities. This then results in a reduction in RLC capability parameters in the UE that are needed for supporting a given reference class; thus, additional support becomes available for use of more U-Plane RLC AM entities. The two major RLC capability parameters reduced are: (a) total RLC AM buffer size (memory); and, (b) maximum number of AM entities.

In regard to (a), the following basic criterion must be fulfilled in the configuration at all times:

$$\sum_{i=1}^{i=RLC\_AM\_entities} (\text{Transmitting\_window\_size})_i \times$$

$$((\text{UL\_AMDPDU\_size})_i - \text{AMD\_Header\_size}) +$$

$$\sum_{i=1}^{i=RLC\_AM\_entities} (\text{Receiving\_window\_size})_i \times$$

$$((\text{DL\_AMDPDU\_size})_i - \text{AMD\_Header\_size}) \leq \text{Total\_buffer\_size}$$

Considering the statistical multiplexing, the Transmitting_window_size and Receiving_window_size can be optimized for one SRB carrying the NAS and RRC signalling, resulting in a reduction of total buffer size needed for the AM SRB entity.

In regard to (b), reduction in the number of AM SRBs will result in reduction of the maximum number of RLC AM entities that need to be supported for a given UE reference class; thus, there is support for more U-Plane RLC AM entities.

BRIEF DESCRIPTION OF DRAWINGS

Preferred features of the present invention will now be described, by way of example only, with reference to the accompanying drawings, in which.

BEST MODE FOR CARRYING OUT THE INVENTION

The subject invention is illustrated by a preferred embodiment relating to a RRC connection set-up procedure between a UE and the E-UTRAN.

This preferred embodiment utilizes Signal Radio Bearers SRB1, SRB2, SRB3 and SRB4. SRBI operates in Unacknowledged Mode (UM), while SRB2, SRB3 and SRB4 operate in Acknowledged Mode (AM).

Figure 1:
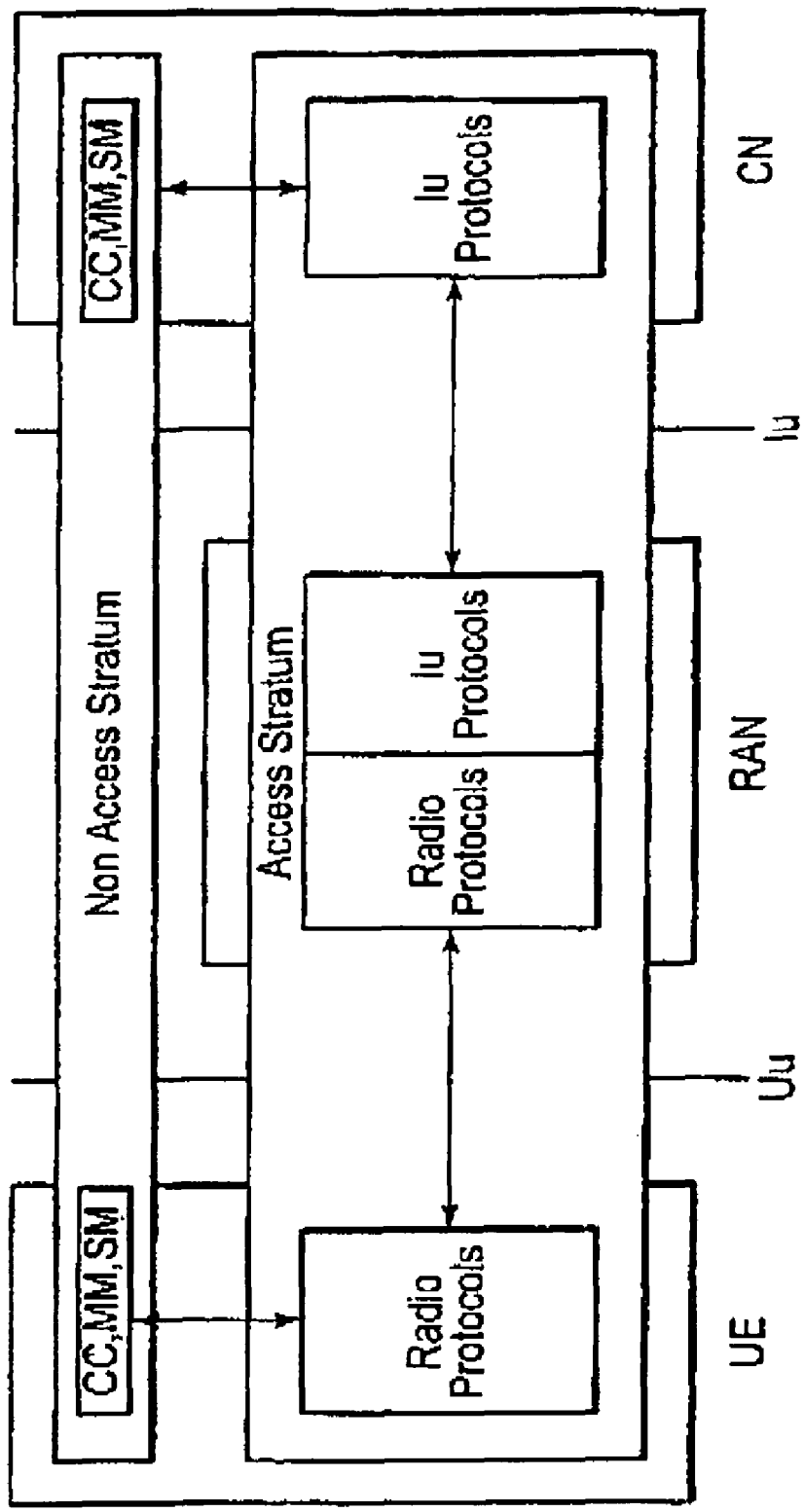
FIG. 1 is an overview of the C-Plane and the NAS protocols.
Figure 2:
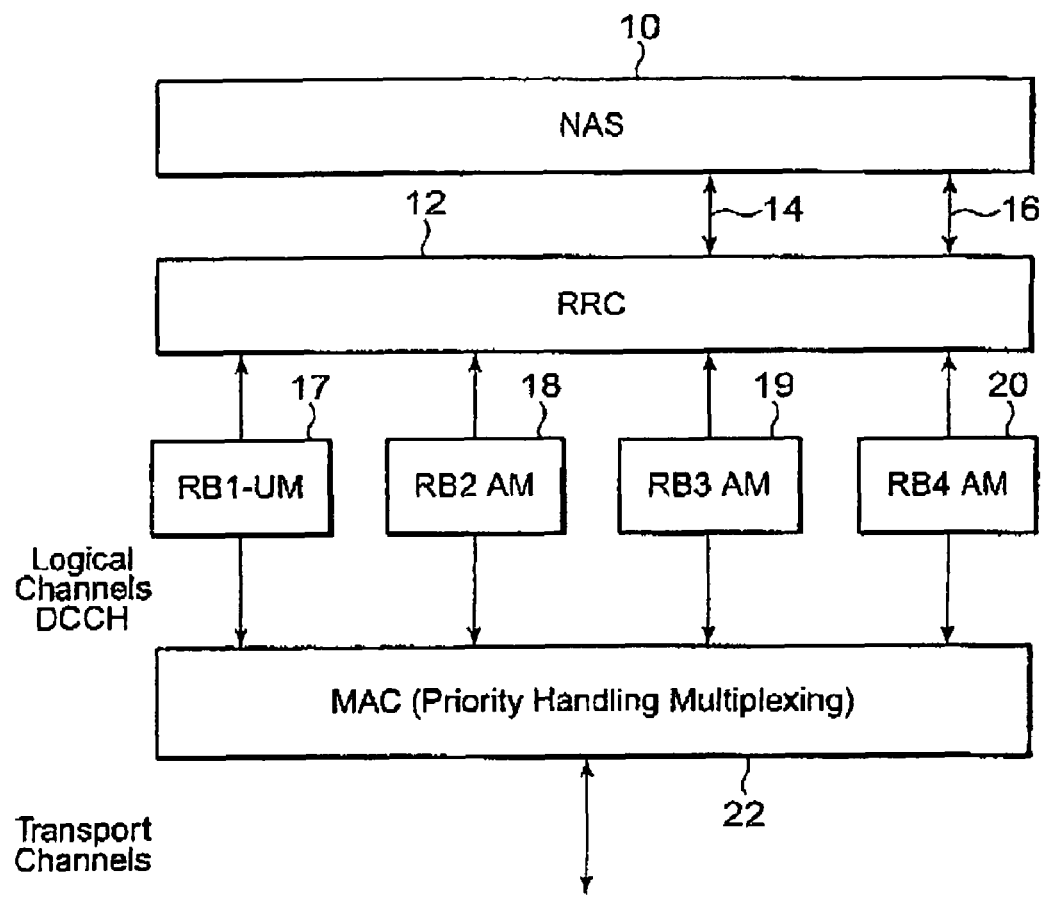
FIG. 2 is a block diagram of a conventional C-Plane radio interface protocol architecture.

In the conventional architecture of FIG. 2, three AM Signalling Radio Bearers and one UM Signalling Radio Bearers are shown for passing signals between the RRC and the MAC in the E-UTRAN. Each Bearer can be looked upon as a logical channel for passing signals. The four SRBs 17 to 20 shown in FIG. 2 are:

| | |
|---|---|
| SRBl-UM | this SRB is used to carry RRC signalling performed in support of AS specific needs (RLC is operating in Unacknowledged Mode) |
| SRB2-AM | this SRB is used to carry RRC signalling performed in support of AS specific needs (RLC is operating in Acknowledged Mode) |
| SRB3-AM | this SRB is used to carry High-Priority RRC signalling performed in support of NAS specific needs (RLC is operating in Acknowledged Mode) |
| SRB4-AM | this SRB is used to carry Low-Priority RRC signalling performed in support of NAS specific needs (RLC is operating in Acknowledged Mode) |

A reduction of the approximately 830-millisecond time taken to set up sequentially the four Signal Radio Bearers SRB1 to SRB4 is achievable. The four SRBs are included in a single inclusive SRB, thereby saving the delay of setting up three of the SRBs.

Conventionally (as well as in this preferred embodiment) the MAC 22 only accesses data control information received on the SRBs 17 to 20 in a sequential manner rather than in parallel. Thus the duration of transmission of the control data over four SRBs takes no longer than the duration of transmission of that data over a single SRB. However, there is a significant saving in the setup time.

One important factor that must be addressed, however, is the following. The MAC needs to identify among, and prioritize among, the signals received on the single SRB. This is not a problem with the conventional scheme with four SRBs, because the MAC 22 has four input channels and it knows what to expect from each. However, a single incoming channel carrying four types of control data presents the MAC with the problem of identifying between the four types, i.e. knowing where one type of control data ends and another starts, and giving them priority inter se. For instance, a RRC Message (SRB2 message) needs to be transmitted by MAC 22 before a Low-Priority NAS Message (SRB4 message).

The subject invention addresses this problem by adding to either the right end or the left end of the RRC/NAS Message (control data), i.e. one of the ends of the single SRB, a two-digit Protocol Discriminator (PD), i.e. an identifier. The mapping of SRB content with PD is the following:

| PD | SRB Mapped | Content |
|---|---|---|
| 00 | SRB1 & SRB2 | RRC Messages in UM Mode & in AM Mode |
| 01 | SRB3 | High-Priority NAS Messages in AM Mode |
| 10 | SRB4 | Low-Priority NAS Messages in AM Mode |

It will be appreciated that the number of digits required for the PD is dependent upon the number of SRBs being mapped.

Figure 3:
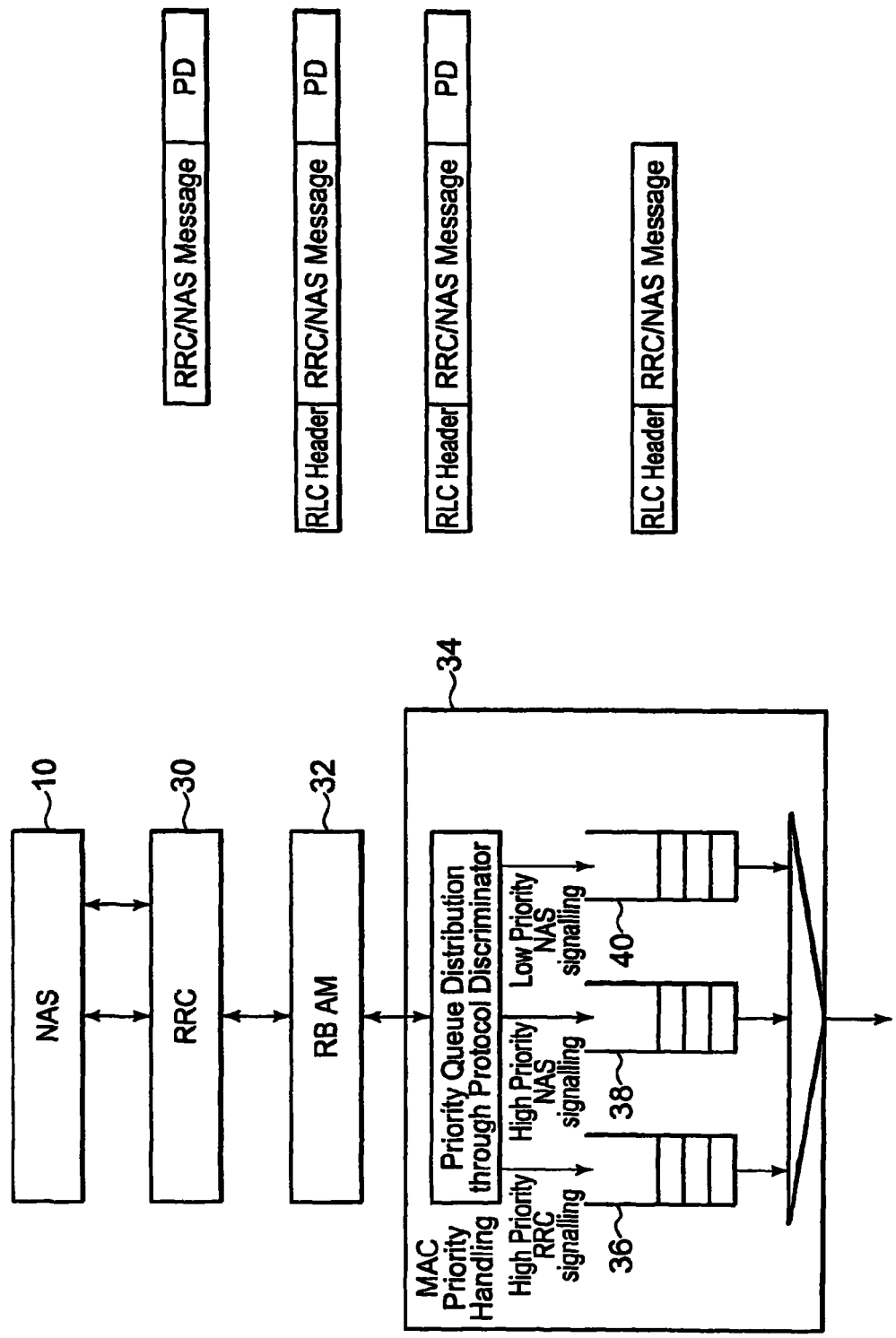
FIG. 3 is a block diagram of the C-Plane E-UTRAN radio interface protocol architecture of the subject invention, the diagram illustrating MAC priority handling of a single SRB.

This operation is performed in the modified RRC 30 of FIG. 3. The modified RRC 30 differs from the RRC 12 of FIG. 2 in that it is able to channel the content of the conventional Signalling Radio Bearers SRB1, SRB2, SRB3 and SRB4 into a single inclusive SRB 32.

As is shown in FIG. 3, a modified MAC 34 identifies the three types of incoming message carried on the single SRB by using the PD, and after identification, prioritises them into a Priority Queue Distribution by placing them in one of three queues: a first queue 36 for High-Priority RRC signalling messages, a second queue 38 for High-Priority NAS signalling messages, and a third queue 40 for Low-Priority NAS signalling messages. As shown on the right side of FIG. 3, the PD identifier is added at the modified RRC 30 and in this embodiment is stripped off at the modified MAC 34, and is thus not part of the control data forwarded to the physical layer for radio transmission. The PD has normally served its purpose once a RRC/NAS message has been placed into the right queue, although it should be appreciated that the PD identifier could remain and form part of control data forwarded to the physical layer if that should be necessary. After transmission of the RRC and NAS messages by the physical layer downstream of the MAC 34 according to the priority queues of the modified MAC 34, the received RRC and NAS messages are ASN 1-decoded by the recipient to identify whether each message is intended for the RRC or the NAS layer of the recipient. With such decoding available, the recipient does not normally need PD to be transmitted with the RRC or NAS message.

The right side of FIG. 3 also illustrates that a RLC Header is added to each RRC/NAS Message for passage on the single SRB, and that such header is not removed at the modified MAC 34.

The preferred embodiment may therefore deal with setting up one AM Signalling Radio Bearer with default configurations for L2 (using E-RLC and E-MAC entities) and LI. Significant gains in terms of RRC connection setup times are achievable, along with reduction in RRC message size. Furthermore, use of default configuration reduces the complexity of checking the parameters for L2 and LI within the UE before setting up the L2/L1 entities.

Figure 4:
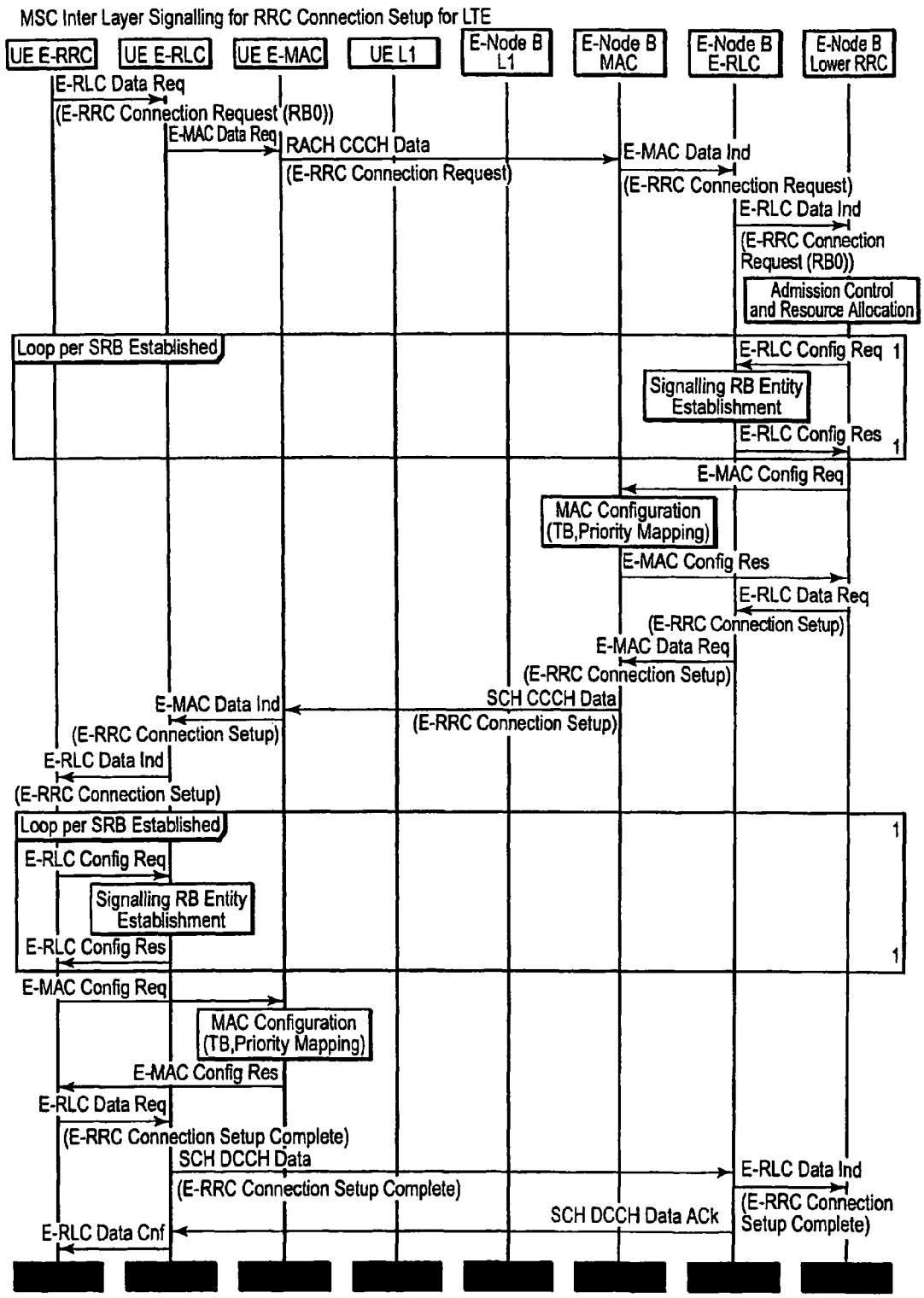
FIG. 4 is a diagram illustrating interlayer signalling for RRC Connection Setup for a LTE system.

FIG. 4 is a diagram illustrating interlayer signalling that would be used in the subject invention. As can be seen, control signals are passed initially from the E-RRC (RRC in UTRA), through the E-RLC of the UE to the E-MAC. After establishment of the E-MAC queues, E-RRC Connection Request signals are sent by radio to the E-NodeB via the respective LI physical layers. In response, the E-RRC of the E-NodeB handshakes with the E-NodeB E-MAC to create a connection setup having the single SRB of the invention. The queues created in the E-MAC of the E-NodeB are then used in controlling transmission of the E-RRC Connection Setup signals to the UE E-MAC. The UE E-MAC forwards the Connection Setup signals to the UEE-RRC. Then a single SRB of the subject invention is created by handshaking between the E-RRC and E-MAC of the UE for forwarding signals to the E-NodeB that the E-RRC Connection Setup is complete. The use of the subject invention is indicated in FIG. 4 by the boxes marked "Loop per SRB Established".

Thus, this invention proposes a reduction in the number of Signalling Radio Bearers to be set up during RRC Connection Setup. The motivation is to reduce C-Plane latency, as discussed in "3GPP TR 25.913, v7.10 (2005-09), Requirement for Evolved UTRA and Evolved UTRAN", by simplifying RRC Connection Setup Procedure for LTE.

In the conventional system, four signalling bearers (SRBs) are set up at the time of the RRC Connection Setup procedure. These SRBs have the following functions:

SRB1 is used to carry RRC signalling performed in support of Access Stratum specific needs (RLC operates in unacknowledged mode);

SRB2 is used to carry RRC signalling performed in support of Access Stratum specific needs (RLC operates in acknowledged mode), SRB3 is used to carry high priority RRC signalling performed in support of Non-Access Stratum specific needs (RLC operates in acknowledged mode); and, SRB4 is used to carry low priority RRC signalling performed in support of Non-Access Stratum specific needs (RLC operates in acknowledged mode)

Setting up RRC connection with these four SRBs would typically require about 830 ms, as discussed by C Johnson & H Holma in "Connection Setup Delay for Packet Switched Services" (Proceedings Sixth IEE International Conference on 3G and Beyond; November 2005), independent of the bit rates of the signalling radio bearers (14.8-3.7 kbps). A reduction in delay can be achieved if only one, as opposed to four, AM Signalling Radio Bearer is set up during RRC connection Setup procedure.

In order to facilitate multiplexing of SRBs a Protocol Discriminator/Identifier (PD), which is also referred to as a Protocol Discriminator or a Protocol Identifier, can be added for distinguishing RRC Signalling Messages and High-Priority and Low Priority NAS Signalling (Direct Transfer), as shown in Table 1 The PD identifies the L3 protocol to which the standard Layer-3 message belongs. The correspondence between L3 protocols and PDs is one-to-one.

TABLE 1

Existing SRB Mapping with Protocol Discriminator/Identifier (PD)

| Protocol Discriminator | Mapping of SRB |
| --- | --- |
| 00 | RRC Messages (SRB1, SRB2) |
| 01 | High Priority NAS Messages (SRB3) |
| 10 | Low Priority NAS Messages (SRB4) |

Although specifications allow SRB2, SRB3 and SRB4 to be configured with different RLC parameters, in practice these SRBs have identical parameters. Hence, it can be assumed that there is no specific requirement to configure AM SRBs with different RLC parameters.

However, priority handling at the MAC level, with a single SRB carrying both RRC and NAS signalling needs, is to be investigated further.

Further reduction in the setup delay can be achieved by using default configuration parameters for the L2 (E-RLC and E-MAC entities) and LI for the SRB. As default configuration parameters will not be signalled by the network in the over-the-air interface to the UE, the message size for RRC Connection Setup can be significantly reduced. Furthermore, the complexity and the time required in the UE in retrieving and checking L2 and LI parameters for setting up the RLC and MAC, and con-figuring LI for the SRB can be significantly reduced, thereby resulting in the overall gains in RRC Connection Setup time.

Therefore, in order to achieve reduced C-Plane Latency in LTE, we suggest setting up one AM mode Signalling Radio Bearer with default configuration parameters for L2 (E-RLC and E-MAC entities) and LI. A reduction of RRC Connection Set up time of about 600 ms is achievable with the proposed method as it eliminates the need for setting up sequentially the four Signal Radio Bearers. Further gains in terms of RRC Connection Setup times are expected by using the default configuration along with the reduction in RRC messages size. Using default configuration would reduce the complexity in terms of checking the parameters for L2 and LI within the UE for correctness before setting up its L2/L1 entities that will further result in the reduction of the RRC Connection Setup time. Priority handling for the SRB at the MAC level and the need for using UM SRBI for E-RRC needs to be further investigated.

Additional background references are: (i) R2-051759, LTE: RAN WG2 Summary, and (ii) 3GPP TR 25.813, v0.1.0 (2005-11), Radio interface protocol aspects.

A reduction in the number of Signalling Radio Bearers to be set up during RRC Connection Setup was proposed for reducing C-Plane latency However, reducing the number of SRBs from four to one gives rise to another problem that the priority between RRC and NAS signalling messages is completely lost at the MAC layer at the sending end.

Figure 5:
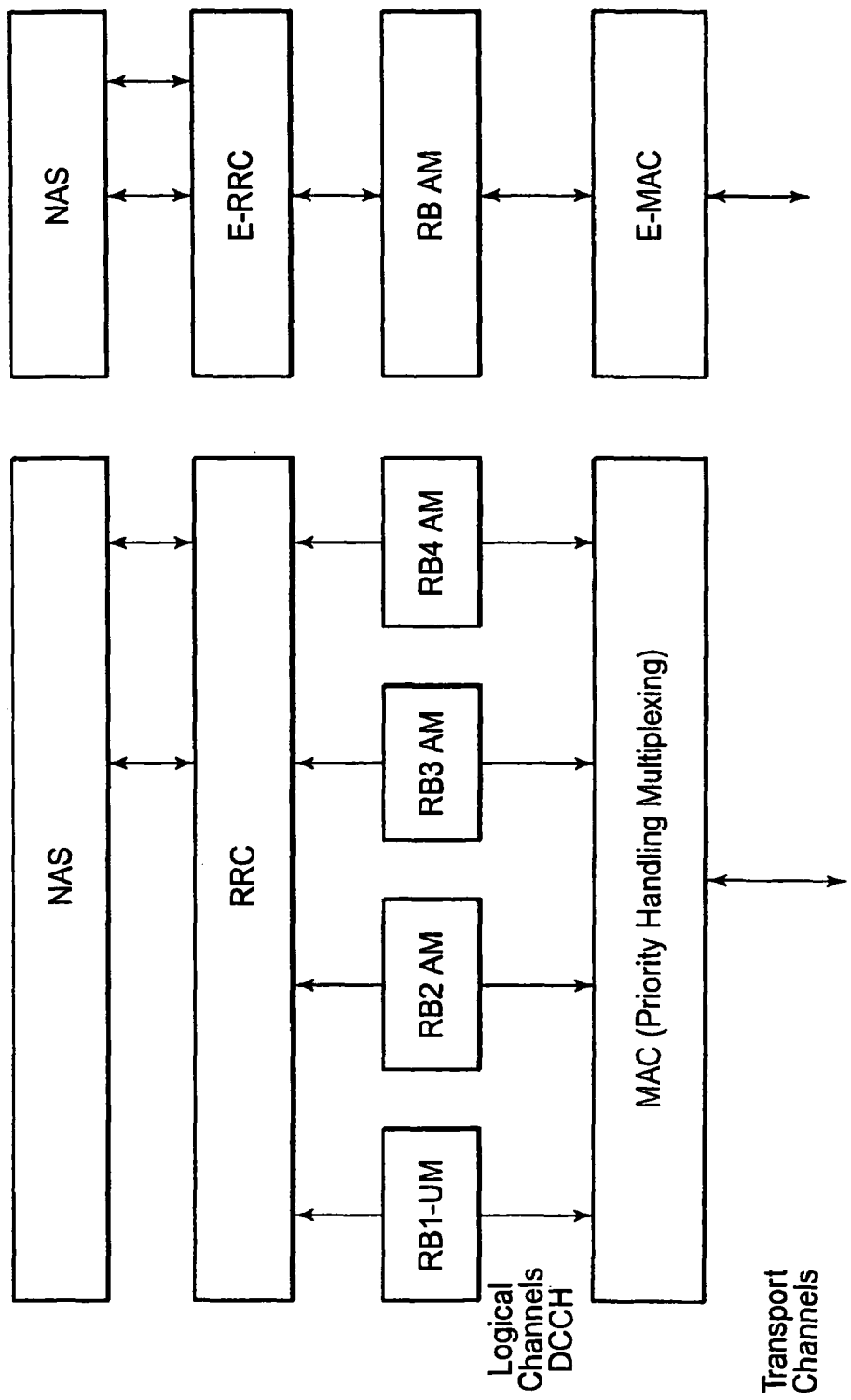
FIG. 5 is a block diagram comparing (on the left side) current Rel-6 C-Plane Radio Interface Protocol Architecture with (on the right side) a proposed LTE Architecture; and, FIG. 6 is a block diagram illustrating MAC Priority Handling at the sending end, and illustrating the Protocol Discriminator/Identifier (PD).

In FIG. 5, current Rel-6 the C-Plane Radio Interface Protocol Architecture is shown on the left side and one proposed for LTE is shown on the right side. Setting up four SRBs in the existing UTRAN would typically require about 830 ms, independent of the bit rates of the signalling radio bearers (14.8-3.7 kbps), for the RRC Connection Setup procedure to complete. A reduction in delay can be achieved if only one AM Signalling Radio Bearer is set up during RRC connection Setup procedure for LTE, as shown in the right side of FIG. 5.

In order to facilitate multiplexing of SRB's, a protocol identifier is to be added for distinguishing RRC Signalling Messages, High Priority and Low Priority NAS Signalling (Direct Transfer) as shown in Table 1.

A problem that arises by reducing the number of SRBs to one is that the priority between RRC and NAS signalling messages is completely lost at the MAC layer at the sending end. MAC layer in such a case has to serve the queue on a first-come/first-serve basis, resulting in a situation where a RRC Message will get blocked and will only get transmitted after the lower priority NAS Signalling message ahead of it has been transmitted.

Figure 6:
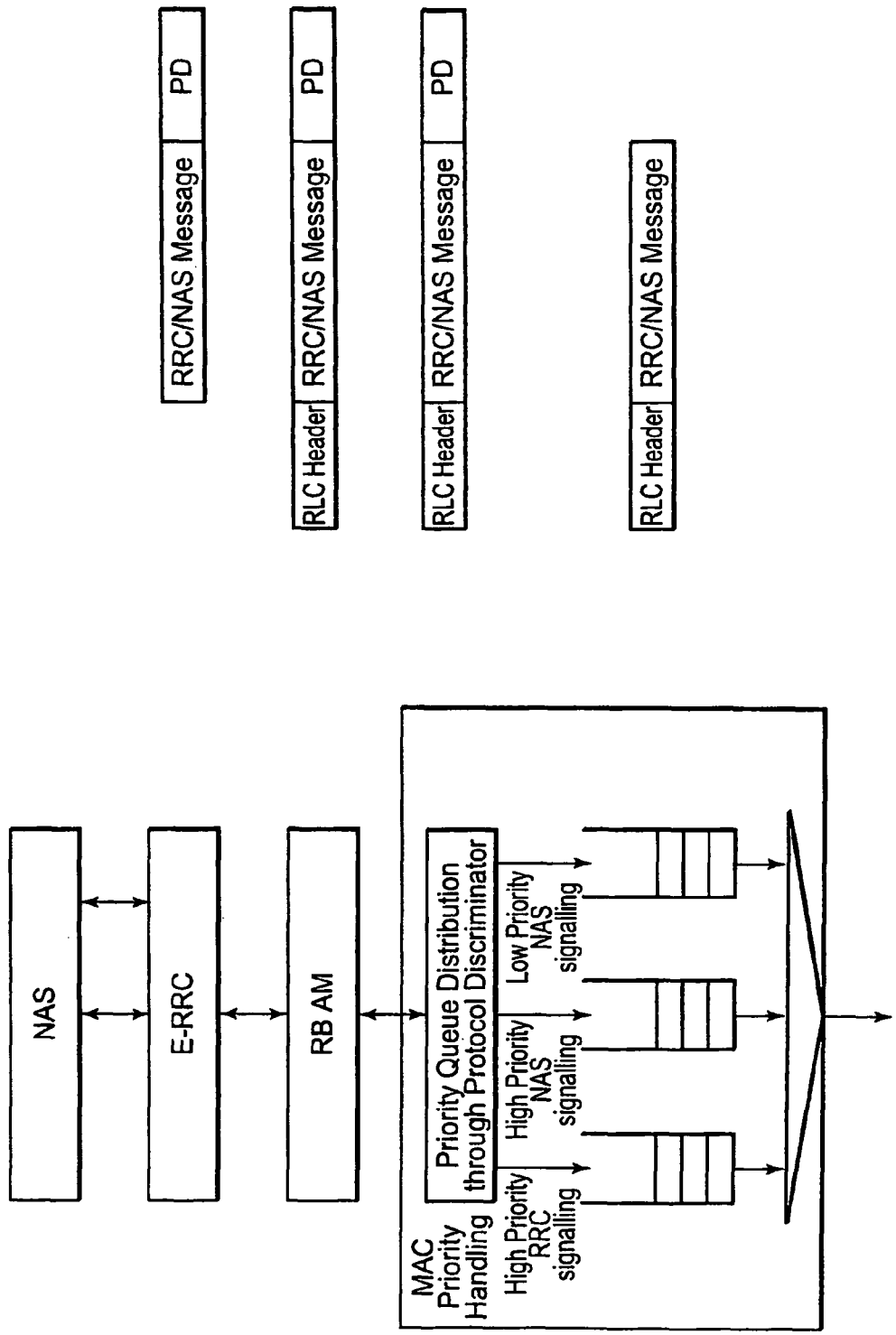

In order to overcome this problem of MAC priority handling, a Protocol Discriminator/Identifier (PD) is used, as shown in FIG. 6. The PD will be required only at the sending end, between RRC and MAC, for priority handling. At the MAC layer, the PD is used by Priority Queue Distribution for separating RRC/NAS signalling messages. The PD is therefore appended on the tail, so that it can be stripped before the message is put into the appropriate queue.

The Priority Queue Distribution Entity has the task of evaluating the Protocol Discriminator/Identifier (PD) associated with the RRC/NAS message, and of forwarding the RRC/NAS Message to the associated priority queue.

It is important to note that the PD is not transmitted over-the-air since at the receiving end the RRC entity would first do ASN 1 decoding to find out if it is a RRC or NAS message. Hence, the amount of bits transmitted over the air is also reduced.

Thus the problem that arises by reducing the number of SRBs to one is that the priority between RRC and NAS signalling messages is completely lost at the MAC layer at the sending end. The MAC layer in such a case has to serve the queue on a first-come/first-serve basis, resulting in a situation where a RRC Message will get blocked and will only get transmitted following transmission of the lower-priority NAS Signalling message ahead of it. A simple mechanism has been described by which the priority handling of different RRC/NAS messages can be incorporated by means of a Protocol Discriminator/Identifier (PD) that the MAC entity can use at the sending end with one SRB for LTE.

It is important to note that the PD will not be transmitted over-the-air as, at the receiving end, the RRC entity would first do the ASN 1 decoding to find out if it is a received RRC or NAS message. Hence, the number of bits transmitted over the air is also reduced.

Reduction of the number of Signalling Radio Bearers (SRBs) to be set up during RRC Connection Setup is proposed for reducing C-Plane latency. In regard to the interlayer signalling sequence, the E-RRC layer in the UE leaves the idle mode and initiates RRC connection establishment by sending an RRC Connection Request message using transparent mode on the CCCH logical channel, and the message is transmitted by MAC on the RACK transport channel.

On the E-UTRAN side, upon the reception of RRC Connection Request, the E-RRC layer performs admission control. E-RRC configures parameters on Layer 2 (E-RLC and E-MAC) to establish the DCCH logical channel locally. The configured parameters are transmitted to the UE in an RRC Connection Setup message using unacknowledged mode (UM) on the CCCH logical channel.

Upon reception of the RRC Connection Setup message, the E-RRC layer in the UE configures the L1 and L2 using these parameters to locally establish the DCCH logical channel. When the UE has established the RLC and MAC entities, it transmits an RRC Connection Setup Complete message to the E-UTRAN using acknowledged mode on the DCCH. The exact procedure is illustrated in FIG. 4.

While a preferred embodiment of the present invention has been described, it is to be understood that the words that have been used are words of description rather than limitation, and that changes may be made to the invention without departing from its scope as defined by the appended claims. Each feature disclosed in this specification (which term includes the claims) and/or shown in the drawings may be incorporated in the invention independently of other disclosed and/or illustrated features.

The text of the abstract filed herewith is repeated here as part of the specification.

A communication method for reducing Radio Resource Control (RRC) connection setup time in an Evolved Universal Terrestrial Radio Access Network (E-UTRAN) includes the step of using an inclusive Signalling Radio Bearer (iSRB) in place of a plurality of conventional Signalling Radio Bearers (indSRBs) for transferring signals from Radio Resource Control (RRC) to Medium Access Control (MAC). A Protocol Discriminator (PD) is added to the tail (right side) of each indSRB at the RRC for allowing the MAC to identify each indSRB as received in the iSRB The PD is needed because the MAC would otherwise be unable to place each indSRB into the appropriate prioritizing queue for transmission to the physical layer. The PD is stripped off at the MAC. A preferred embodiment uses the iSRB in place of four conventional indSRBs (SRB1, SRB2, SRB3 and SRB4), but in an alternative form the Unacknowledged Mode SRB (SRBI) would not be present in the system and therefore not included in the iSRB.

The invention claimed is:

1. A communication method, comprising:
   communicating data between a Radio Resource Control (RRC) and a Medium Access Control (MAC) using at least one Signalling Radio Bearer,
   wherein the communicating comprises using at least one inclusive Signalling Radio Bearer (iSRB) serving a function of a plurality of individual Signalling Radio Bearers (indSRBs); and
   identifying, upon arrival at the MAC, respective indSRBs based on the iSRB,
   wherein the communicating further comprises communicating, as part of the iSRB, a Protocol Discriminator (PD) for identifying, at any one time, which one of the indSRBs the iSRB is being used in place of,
   wherein the PD comprises binary digits that are additional to binary digits normally comprised in an indSRB,
   wherein the PD comprises additional binary digits on one of ends of the iSRB,
   wherein the additional binary digits are on a right end of the iSRB,
   wherein the additional binary digits comprise two binary digits, and
   wherein respective PDs to identify which one of the indSRBs is being represented by the iSRB at any one time comprise:
   PD=00 for indSRB representing an SRB1 or an SRB2, wherein the SRB1 is RRC message signals in an Unacknowledged Mode and the SRB2 is RRC message signals in an Acknowledged Mode;
   PD=01 for indSRB representing SRB3, wherein the SRB3 is High-Priority Non-Access Stratum (NAS) message signals in the Acknowledged Mode; and
   PD=10 for indSRB representing SRB4, wherein the SRB4 is Low-Priority NAS message signals in the Acknowledged Mode.

2. A Radio Resource Control (RRC) connection-setup procedure for reducing an RRC connection setup time, the procedure including:
   an inclusive Signalling Radio Bearer (iSRB) communicated in place of a plurality of individual Signalling Radio Bearers (indSRBs) for transferring signals from a Radio Resource Control (RRC) to a Medium Access Control (MAC),
   wherein, upon arrival at the MAC, respective indSRBs are identified based on the iSRB,
   wherein each indSRB relates to Acknowledged-Mode (AM) signals only,
   wherein the AM signals comprise at least one of RRC message signals (SRB2), High-Priority Non-Access Stratum (NAS) message signals (SRB3), and Low-Priority NAS message signals (SRB4), and
   wherein respective Protocol Discriminators (PDs) to identify which one of the indSRBs is being represented by the iSRB at any one time comprise:
   PD=00 for indSRB representing an SRB1 or the SRB2, wherein the SRB1 is RRC message signals in an Unacknowledged Mode;
   PD=01 for indSRB representing the SRB3; and
   PD=10 for indSRB representing the SRB4.

3. A user equipment for a communications network, said user equipment comprising:

first communicating means for communicating data between a Radio Resource Control (RRC) and a Medium Access Control (MAC) using at least one Signalling Radio Bearer, wherein the first communicating means comprises at least one inclusive Signalling Radio Bearer (iSRB) serving a function of a plurality of individual Signalling Radio Bearers (indSRBs); and means for identifying, upon arrival at the MAC, respective indSRBs based on the iSRB, wherein each indSRB relates to Acknowledged-Mode (AM) signals only, wherein the AM signals comprise at least one of RRC message signals (SRB2), High-Priority Non-Access Stratum Non-Access Stratum (NAS) message signals (SRB3), and Low-Priority NAS message signals (SRB4), wherein respective Protocol Discriminators (PDs) to identify which one of the indSRBs is being represented by the iSRB at any one time comprise:

PD=00 for indSRB representing an SRB1 or the SRB2, wherein the SRB1 is RRC message signals in an Unacknowledged Mode;

PD=01 for indSRB representing the SRB3; and

PD=10 for indSRB representing the SRB4.

\* \* \* \* \*